United States Patent
Kai et al.

(10) Patent No.: US 7,408,700 B2
(45) Date of Patent: Aug. 5, 2008

(54) OPTICAL SWITCH, AND METHOD FOR CONTROLLING DRIVE VOLTAGE THEREOF

(75) Inventors: Yutaka Kai, Kawasaki (JP); Setsuo Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 11/384,288

(22) Filed: Mar. 21, 2006

(65) Prior Publication Data
US 2006/0221432 A1    Oct. 5, 2006

(30) Foreign Application Priority Data
Mar. 31, 2005    (JP) .............................. 2005-102764

(51) Int. Cl.
*G02F 1/29* (2006.01)
(52) U.S. Cl. ...................... 359/320; 359/316
(58) Field of Classification Search ................. 359/316, 359/320
See application file for complete search history.

(56) References Cited

U.S. PATENT DOCUMENTS

| | | | |
|---|---|---|---|
| 5,974,216 A | 10/1999 | Nakaya | ....................... 385/140 |
| 6,411,430 B1 | 6/2002 | Ogino et al. | ............ 359/337.11 |
| 6,504,966 B2 | 1/2003 | Kato et al. | ..................... 385/16 |
| 6,697,547 B2 * | 2/2004 | Walter et al. | ................... 385/16 |

FOREIGN PATENT DOCUMENTS

| | | |
|---|---|---|
| JP | 7-212315 | 8/1995 |
| JP | 10-228007 | 8/1998 |
| JP | 2000-114629 | 4/2000 |
| JP | 2000-269892 | 9/2000 |
| JP | 2002-318398 | 10/2002 |
| JP | 2003-185984 | 7/2003 |

* cited by examiner

*Primary Examiner*—William C Choi
(74) *Attorney, Agent, or Firm*—Staas & Halsey LLP

(57) ABSTRACT

An optical switch which minimizes losses in the power of output light while enabling deflection of light within a range of comparatively large deflection angles used for setting switching among output ports. The optical switch is configured to have a first light deflection element deflecting the input light at an angle appropriate to a position of an designated port with an applied first drive voltage; and a second light deflection element finely adjusting a deflection angle of the light output from the first deflection element to the designated port with an applied second drive voltage such that power of light output from the designated port becomes maximum.

13 Claims, 12 Drawing Sheets

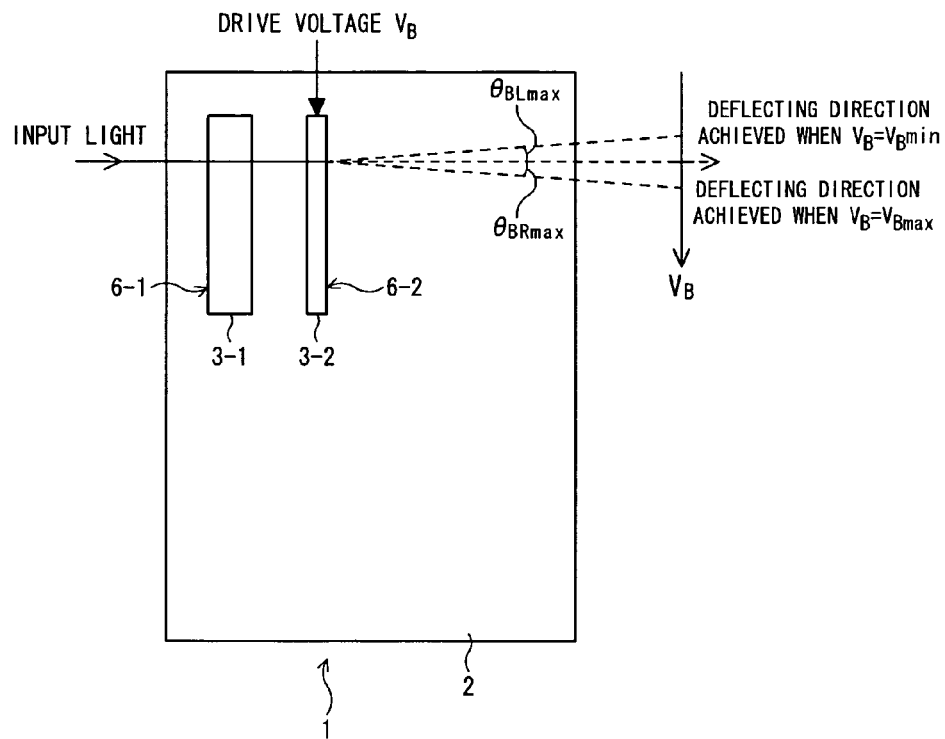

| DESTINATION OF OUTPUT | CONTROLLED VOLTAGE: $V_A$ |
|---|---|
| PORT 1 | $V_{A1} - \Delta V_A$ |
| PORT 2 | $V_{A2} - \Delta V_A$ |
| PORT 3 | $V_{A3} - \Delta V_A$ |
| NONE | $V_{OFF} - \Delta V_A$ |

4a

OPTICAL SWITCH, AND METHOD FOR CONTROLLING DRIVE VOLTAGE THEREOF

BACKGROUND OF THE INVENTION

1) Field of the Invention

The present invention relates to an optical switch and a method for controlling a drive voltage thereof.

2) Background of the Invention

Developing an optical switch, which is formed from a light deflection device using a crystal involving an electro-optic effect, as an optical switch applied to an optical communications system has recently been pursued.

As shown in FIG. 14, a light deflection device 101 has a ferroelectric crystal 102 possessing an electro-optic effect, and a pair of electrodes 103 formed on opposing faces (a front face 102-1 and a back face 102-2 opposing with each other in the drawing) of the crystal 102. When a drive voltage is supplied to the electrodes 103, light entering one side face 102-3 of the crystal 102 can be deflected by means of the electro-optic effect.

This light deflection device 101 has the property of varying a deflection angle of input light by means of varying the drive voltage supplied to the electrodes 103. Specifically, as shown in FIG. 14, the light deflection device 101 is configured so as to be able to deflect and output the input light in a deflected direction D1 by means of setting the drive voltage V to V1; to deflect and output the input light in a deflected direction D2 by means of setting the drive voltage V to V2; and to deflect and output the input light in a deflected direction D3 by means of setting the drive voltage V to V3.

By means of setting an output port to a light output position which varies according to a deflection angle of the input light, the light deflection device 101 can be configured as an optical switch 101A which selectively switches the output destination of the input light to any one of a plurality of output ports (three output ports #21 to #23 in the drawing) by means of switching the drive voltage.

Moreover, in this optical switch 101A, the drive voltage supplied to the electrodes 103 is set so as to be switched according to an output port which is the output destination of the input light. Accordingly, the optical switch 101A can be equipped with a control circuit 104 and a drive circuit 105. The control circuit 104 is made to be able to fetch data pertaining to a drive voltage to be used for setting a deflection angle for each output port which is a destination, and to output the thus-fetched data as a control signal to the drive circuit 105. The drive circuit 105 can supply the electrodes 103 with a drive voltage in accordance with the control signal that has been output from the control circuit 104.

Known documents relating to the present invention are Patent Documents 1 to 6 provided below.

(Patent Document 1) JP-2002-318398A
(Patent Document 2) JP-2003-185984A
(Patent Document 3) JP-2000-114629A
(Patent Document 4) JP-2000-269892A
(Patent Document 5) JP-HEI-7-212315A
(Patent Document 6) JP-HEI-10-228007A However, the optical switch 101A formed from such a light deflection device 101 can speed up the switching response of an output channel, by means of the control circuit 104 and the drive circuit 105 controlling the supply of the drive voltage. Conversely, the drive circuit 105 must be provided with a comparatively-wide dynamic range, as the range of the drive voltage, depending on the position of the output port. For instance, depending on a deflection direction, the value of a drive voltage to be supplied to the electrodes 103 must be increased to about hundreds of volts, which is tens of times or more the voltage value of the control signal output from the control circuit 104; or the voltage must be substantially cut off.

When the drive voltage is increased to about tens of times or more the voltage of the control signal as mentioned previously, a high voltage output circuit must be configured as the drive circuit 105 to thereby generate a drive voltage whose value is tens of times the voltage of the control signal. The value of the drive voltage generated by such a drive circuit 105 contains an error component in relation to the control signal output from the control circuit 104. Accordingly, difficulty is encountered in controlling a deflection angle with comparative precision by means of the control circuit 104 controlling the drive voltage output from the drive circuit 105, to thus raise a problem of occurrence of losses in the power of light output from the output port.

As a result of the light deflection device being used as the optical switch 101A, a relationship between the drive voltage output from the drive circuit 105 and the deflection angle gradually changes [i.e., occurrence of a DC (Direct Current) drift], which also raises a problem of the DC drift hindering stabilization of power of the output light.

As shown in FIG. 15, in a case where V2, which is set when the output port #22 is taken as a destination, is supplied as a drive voltage, losses in the light to be output from the output port #22 (optically coupled to the output port) is minimized before occurrence of a DC drift, and hence the power of the light can be maximized. When the drive voltage V2 is supplied after occurrence of a DC drift, a deviation Δθ arises in the angle at which input light is deflected. Losses arise in the power of light output from the output port #22.

A conceivable principal factor responsible for this DC drift is the distortion remaining in an atomic arrangement constituting a crystal structure, because of an increase in an accumulated time during which a comparatively-high drive voltage is supplied to the crystal 102, even when the drive voltage is cut off.

As mentioned previously, Patent Documents 1 to 6 described above do not provide any technique of controlling a deflection angle with comparatively high accuracy while covering the range of a comparatively-wide deflection angle for the purpose of switchingly setting an output port as a deflectable range, or a technique of stabilizing the power of an output in the event of occurrence of a DC drift while maintaining the performance of a response to switching of an output channel.

SUMMARY OF THE INVENTION

The present invention has been conceived in view of the drawbacks and minimizes losses in the power of output light (or maximizing the power of the output light) while rendering light deflectable over the range of a comparatively-wide deflection angle for the purpose of switchingly setting an output port.

Moreover, the present invention minimizes losses in the power of an output in the event of occurrence of a DC drift (or maximizes the power of output light) while maintaining the performance of response to switching of an output channel.

To these ends, the present invention is characterized by providing an optical switch which deflects input light to thus output the input light to a designated part of a plurality of output ports in a switching manner, the optical switch comprising: a first light deflection element for deflecting the input light at an angle corresponding a position of the designated port with an applied first drive voltage; and a second light deflection element for finely adjusting a deflection angle of the light propagating from the first deflection element to the designated port with an applied second drive voltage such that power of light output from the designated port becomes maximum.

Preferably, the optical switch may further comprise a first supply control section for controllably supplying the first drive voltage to the first light deflection element; and a second supply control section for controllably supplying the second drive voltage to the second light deflection element such that power of light output from the output port is maximized.

More preferably, the first supply control section includes a storage section for storing information pertaining to the first drive voltage to be supplied for each positions of the plural output ports; a drive voltage control section for outputting a control signal of the first drive voltage corresponding to the designated port by making reference to information in the storage section; and a supply section for supplying the first drive voltage to the first deflecting element in accordance with the control signal output from the drive voltage control section.

Further, the second supply control section preferably includes a power monitor for monitoring power of light output from each of the output ports; and a feedback control section for controlling a feedback of the second drive voltage to be supplied to the second light deflection element, on the basis of a monitoring result output from the power monitor, such that light output from the designated port is maximized.

Moreover, the first supply control section may also include a storage section for storing information pertaining to the first drive voltage to be supplied for each positions of the plural output ports, a drive voltage control section for outputting a control signal of the first drive voltage corresponding to the designated port by making reference to information in the storage section, and a supply section for supplying the first drive voltage to the first deflecting element in accordance with the control signal output from the drive voltage control section. The second supply control section may also include a power monitor for monitoring power of light output from each of the output ports, and a feedback control section for controlling a feedback of the second drive voltage to be supplied to the second light deflection element, on the basis of a monitoring result output from the power monitor, such that light output from the designated port becomes maximum; the second supply control section includes an alarm output section for issuing an alarm to the first supply control section when the second drive voltage controlled by the feedback control section exceeds a preset range of a voltage. The first supply control section may also include an update control section for updating and controlling information about the first drive voltage stored in the storage section when having received the alarm issued from the alarm output section.

In this case, the preset range may be set as a voltage range of the second drive voltage corresponding to an angle range through which the second deflection element can effect deflection.

Further, the update control section may correct information about the first drive voltage such that a direction of deflection effected by the first light deflection element approaches the designated port.

The first and second light deflection elements may be configured such that power of the second light deflection element to resolve a light deflection angle at the second drive voltage becomes higher than power of the first light deflection element to resolve a light deflection angle at the first drive voltage.

Moreover, the first light deflection element may also be configured to comprise a crystal member exhibiting an electro-optic effect and electrodes formed on opposing faces of the crystal member and for receiving a supply of the first drive voltage; and the second light deflection element comprises a crystal member exhibiting an electro-optic effect and electrodes which are formed on opposing faces of the crystal member and for receiving a supply of the second drive voltage.

In this case, the crystal members constituting the first and second light deflection elements may preferably be formed into a single piece.

The present invention is also characterized by providing an optical switch drive voltage control method for controlling drive voltages to first and second light deflection elements of an optical switch comprising, in order to deflect input light to thus output the input light to a designated port of a plurality of output ports in a switching manner, the first light deflection element for deflecting the input light at an angle corresponding to a position of the designated port with an applied first drive voltage, and the second light deflection element for finely adjusting a deflection angle of the light output from the first light deflection element to the designated port with an applied second drive voltage such that power of light output from the designated port is maximized, the method comprising: controllably supplying the first drive voltage to the first light deflection element as a first drive voltage and controllably supplying the second drive voltage to the second light deflection element such that power of light output from the output port is maximized.

As mentioned above, according to the present invention, the second light deflection element is provided along with the first light deflection element. As a result, even when losses have arise in the light output from the output port, the second light deflection element can finely adjust the deflection angle of the light output from the first light deflection element while rendering excellent the response performance of the first light deflection element. Light is made deflectable over the range of a comparatively-wide deflection angle for the purpose of setting switching of the output port, thereby minimizing losses in the power of output light (or maximizing the power of the output light).

BRIEF DESCRIPTION OF THE DRAWINGS

FIG. 5 is a view showing directions into which light is deflected by a second light deflection element of the present embodiment;

FIG. 6 is a view showing data in a storage section;

DESCRIPTION OF THE PREFERRED EMBODIMENT

An embodiment of the present invention will be described hereunder by reference to the drawings.

A disclosure of an embodiment, which is provided below, renders obvious another technical problem, means for solving the technical problem, and a working-effect of the means as well as the above-mentioned objects of the present invention.

[A] Description of an Embodiment

[A1] Overall Configuration

Figure 1:
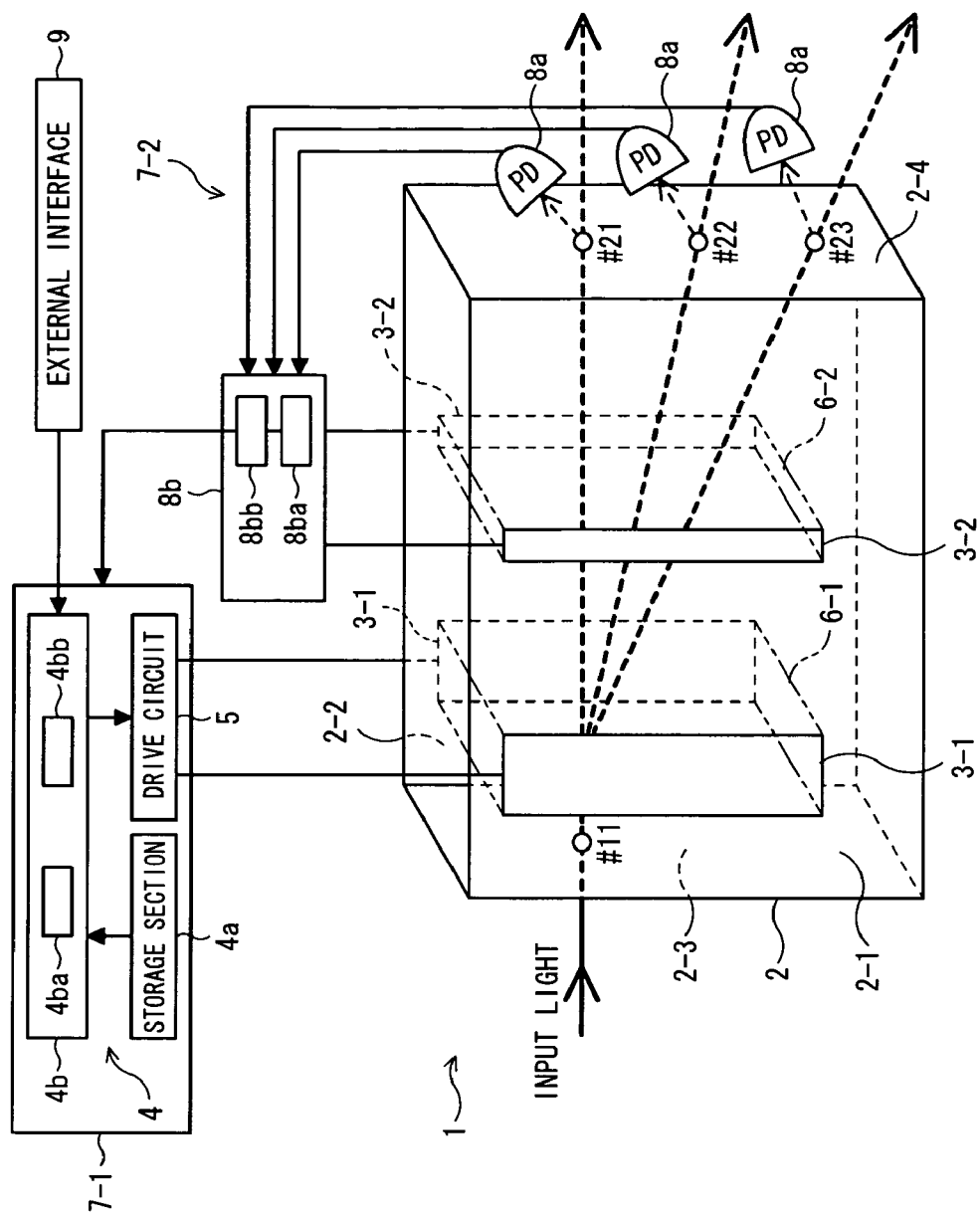
FIG. 1 is a schematic perspective view showing an optical switch according to an embodiment of the present invention.

FIG. 1 is a schematic perspective view showing an optical switch 1 according to an embodiment of the present invention. The optical switch 1 shown in FIG. 1 deflects light input by way of an input port #11, to thus switchably output the input light to designated port of a plurality of (three in FIG. 1) output ports #21 to #23. The optical switch 1 includes a crystal member 2 involving an electro-optic effect, and first and second electrodes 3-1, 3-2 formed on opposing faces (on a front face 2-1 and a back face 2-2 of the crystal member 2 in FIG. 1) of the crystal member 2.

Specifically, in a case where light is input from the input port #11 on one side face 2-3 of the crystal member 2, the first electrodes 3-1 and the second electrodes 3-2 are formed so as to oppose each other with a path—along which light propagates through the crystal member 2—sandwiched therebetween. The first electrodes 3-1 are disposed upstream of the input light, and the second electrodes 3-2 are disposed in positions downstream of the first electrodes 3-1 with respect to the input light.

The input light can be output from any one of the plurality of (e.g., three) output ports #21 to #23 disposed on a face 2-4 opposing the face 2-3 after having propagated through the crystal member 2.

A first light deflection element 6-1 is formed from the first electrodes 3-1, and an area of the crystal member 2 to which an electric field is applied as a result of the first drive voltage being supplied to the first electrode 3-1. The first light deflection element 6-1 is for deflecting the input light at an angle appropriate to the position of the designated port with the applied first drive voltage.

A second light deflection element 6-2, which is disposed in tandem with the first light deflection element 6-1 with respect to the path of input light, is formed from the above-described second electrodes 3-2, and an area of the crystal member 2 to which an electric field is applied as a result of the second drive voltage being supplied to the second electrode 3-2. By means of application of the electric field as a result of supply of the second drive voltage, the second light deflection element 6-2 finely adjusts the deflection angle of light emitted from the first light deflection element 6-1 such that the power of the light output from the output port, which is taken as a destination, is maximized.

Figure 2:
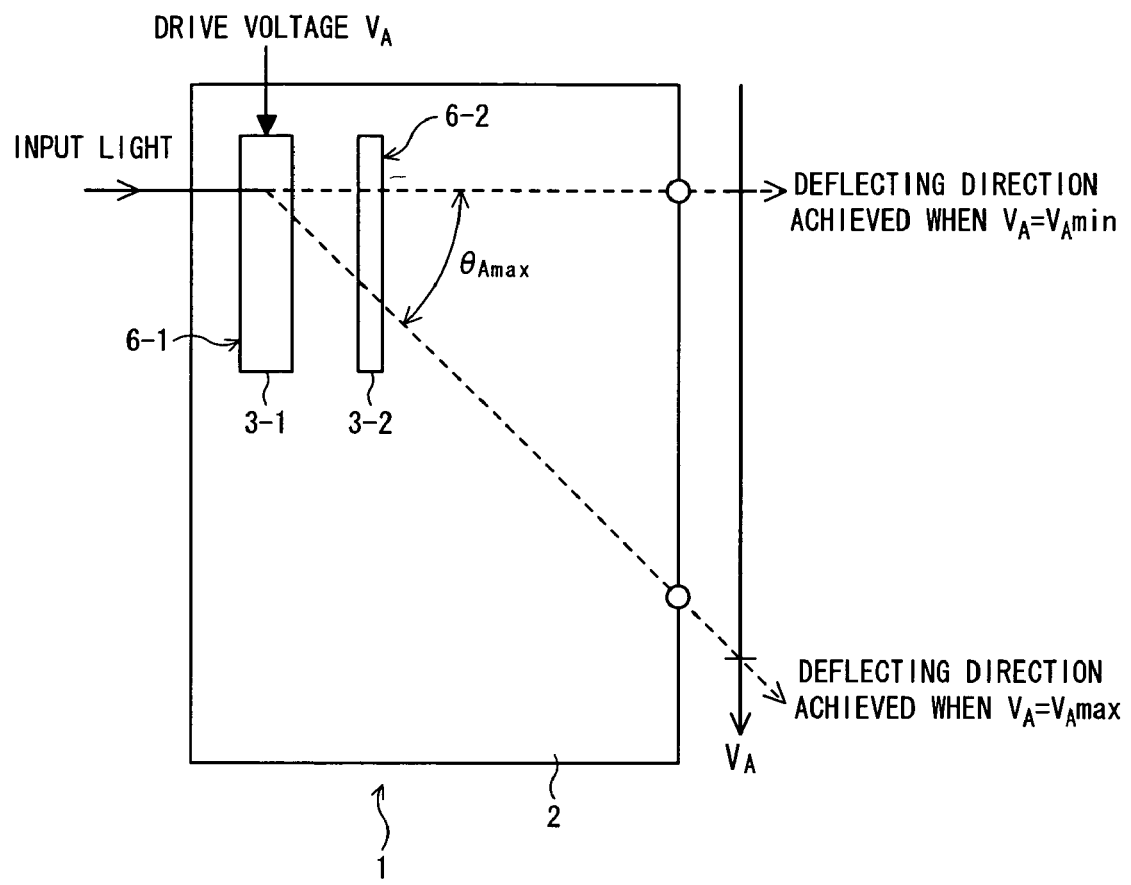
FIG. 2 is a view showing directions into which light is deflected by a first light deflection element of the present embodiment.

As shown in, e.g., FIG. 2, the first electrodes 3-1 forming the first light deflection element 6-1 constitute an electrode for coarse adjustment purpose which can generate, with comparative sensitivity, a large deflection angle in response to the supplied voltage, in order to orient the input light toward the output port that is taken as a destination. Specifically, as illustrated in FIG. 2, when the first drive voltage VA supplied to the first electrodes 3-1 is taken as a minimum value V Amin, the input light can be output in an essentially straight direction. When the first drive voltage VA supplied to the first electrodes is taken as a maximum value V Amax, the input light can be output while being deflected rightward with reference to the propagating direction of the input light at the maximum deflection angle θ Amax.

As shown in FIG. 2, as the first drive voltage VA to be supplied to the first electrodes 3-1 is increased, the deflection angle can be increased. Specifically, as shown in, e.g., FIG. 4, the plurality of output ports #21 to #23 are set to different optical output positions appropriate to the deflection angles of the input light, so that the output destination of the input light can be selectively switched to any one of the output ports #21 to #23 by means of switching the first drive voltage.

Figure 4:
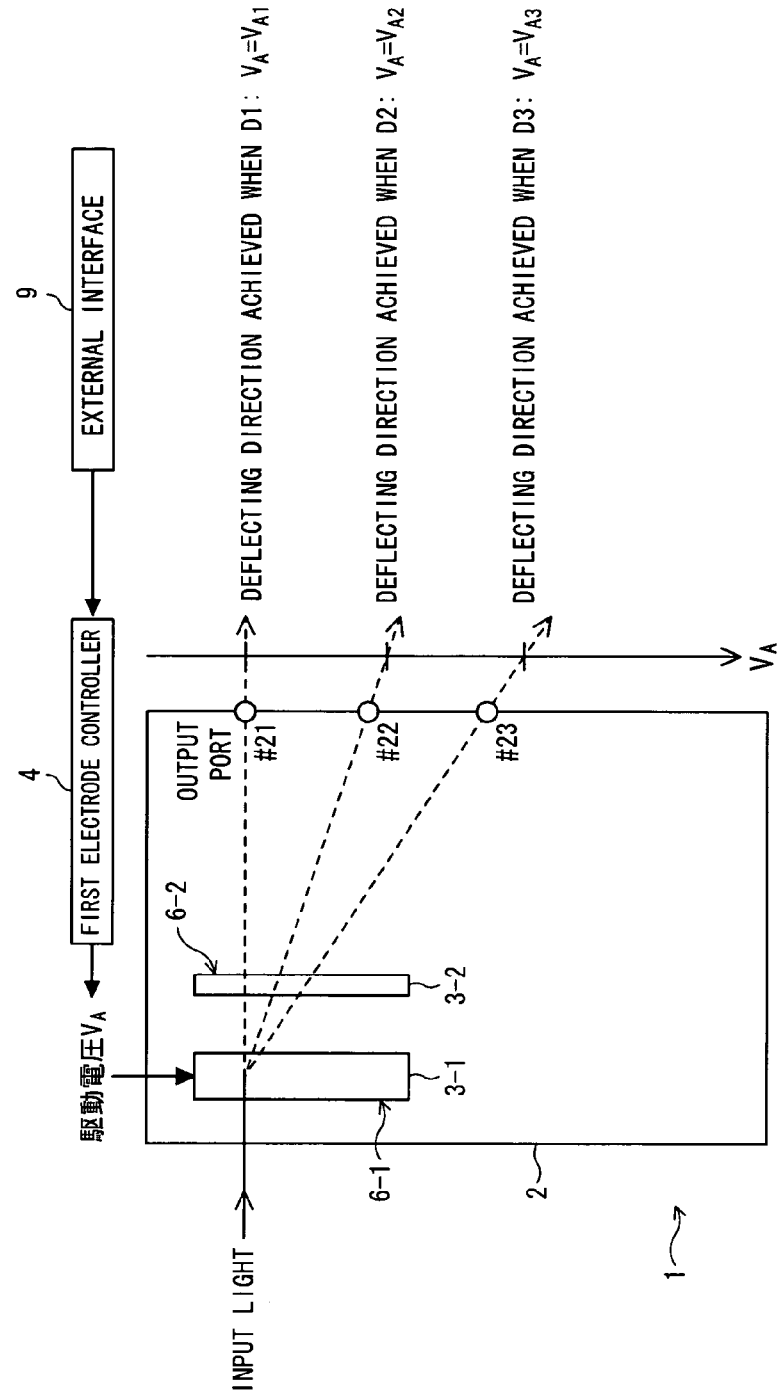
FIG. 4 is a view showing first drive voltages appropriate to output ports in the first light deflection element of the present embodiment and directions in which light is deflected in those cases.

As shown in FIG. 4, the first drive voltage VA is set to VA1 to thus deflect the input light at a deflecting direction D1, whereby the input light is output from the output port #21. The first drive voltage VA is set to VA2 to thus deflect the input light at a deflecting direction D2, whereby the input light is output from the output port #22. The first drive voltage VA is set to VA3 to thus deflect the input light at a deflecting direction D3, whereby the input light is output from the output port #23.

As shown in, e.g., FIG. 5, the second electrodes 3-2 constituting the second light deflection element 6-2 are formed from an electrode for fine adjustment purpose which can generate, with comparatively low sensitivity, a small deflection angle in response to the supplied voltage, for the purpose of finely adjusting the angle at which light is deflected by the first light deflection element 6-1. Specifically, even when the dynamic range of the drive voltage (the second drive voltage) to be supplied to the second electrodes 3-2 is made to have essentially the same dynamic range as that of the first drive voltage supplied to the first electrodes 3-1, the displacement width of the deflection angle of the second light deflection element 6-2 becomes narrower than the displacement width of the deflection angle of the first light deflection element 6-1.

In connection with the case illustrated in FIG. 5, when the second drive voltage VB supplied to the second electrodes 3-2 is set to the minimum value V Bmin, the input light can be output while being deflected leftward at an angle θ BLmax which is sufficiently smaller than θ Amax with respect to the right forward direction. When the second drive voltage VB supplied to the second electrodes 3-2 is set to the maximum value V Bmax, the input light can be output while being deflected rightward at an angle θ BRmax which is sufficiently smaller than θ Amax with respect to the right forward direction.

Consequently, the second light deflection element 6-2 can control the deflection angle of light by the drive voltage (the second drive voltage) with comparatively higher accuracy, as compared with a case where the deflection angle of light is controlled by the first light deflection element 6-1. Put another way, the resolution of the angle at which light is deflected by the second light deflection element 6-2 at the second drive voltage can be made higher than that achieved by the first light deflection element 6-1. Alternatively, the level of resolution of the deflection angle and the degree of a deflectable angle, which are yielded by the first and second electrodes 3-1, 3-2 at the supplied voltage, can be defined by the shapes of the first and second electrodes 3-1, 3-2.

Figure 3:
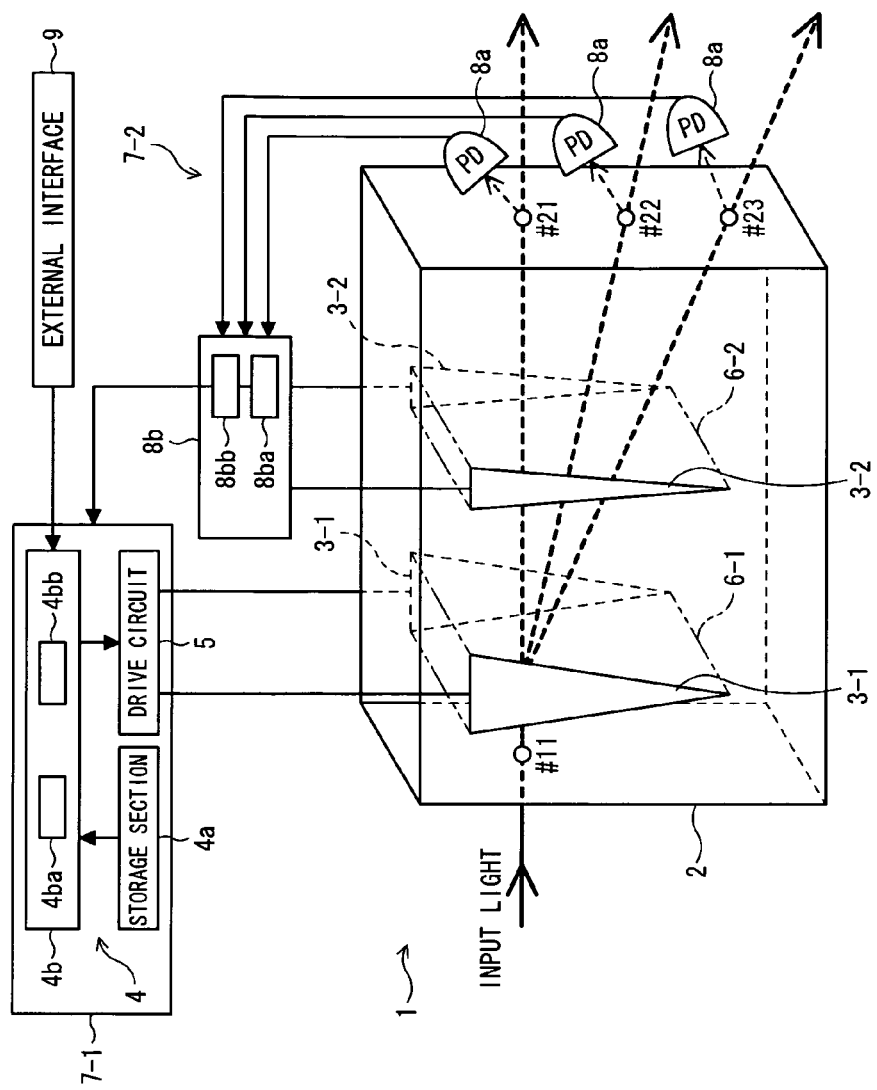
FIG. 3 is a schematic perspective view showing a modification of the optical switch according to an embodiment of the present invention.

For instance, the area of the second electrodes 3-2 is made narrower than that of the first electrodes 3-1; and, as shown in FIG. 3, the first and second electrodes 3-1, 3-2 can be formed into the shape of an isosceles triangle while the second electrodes 3-2 are formed into the shape of an isosceles triangle whose apex angle is more acute than that of the isosceles triangle of the first electrodes 3-1. Further, the first electrodes 3-1 can be formed into a configuration where a plurality of electrodes are connected in tandem, and the second electrodes 3-2 can be defined by means of making the number of tandem connections smaller than that of the tandem connections constituting the first electrodes 3-1.

The first light deflection element 6-1 is used for selecting any one, which is to become an output destination of input light, from the output ports #21 to #23. The second light deflection element 6-2 for fine adjustment purpose can deflect light over the range of a comparatively-wide deflection angle, by means of the first light deflection element 6-1 for coarse adjustment purpose, to thus stabilize the power of light output from the output ports #21 to #23. Accordingly, the second light deflection element 6-2 is used for stabilizing the power of output light in the event of occurrence of the DC drift.

The optical switch 1 shown in FIG. 1 comprises a first electrode controller 7-1 for controlling the supply of the first drive voltage VA to the first electrodes 3-1, and a second electrode controller 7-2 for controlling the supply of the second drive voltage VB to the second electrodes 3-2.

Figures 13, 14:
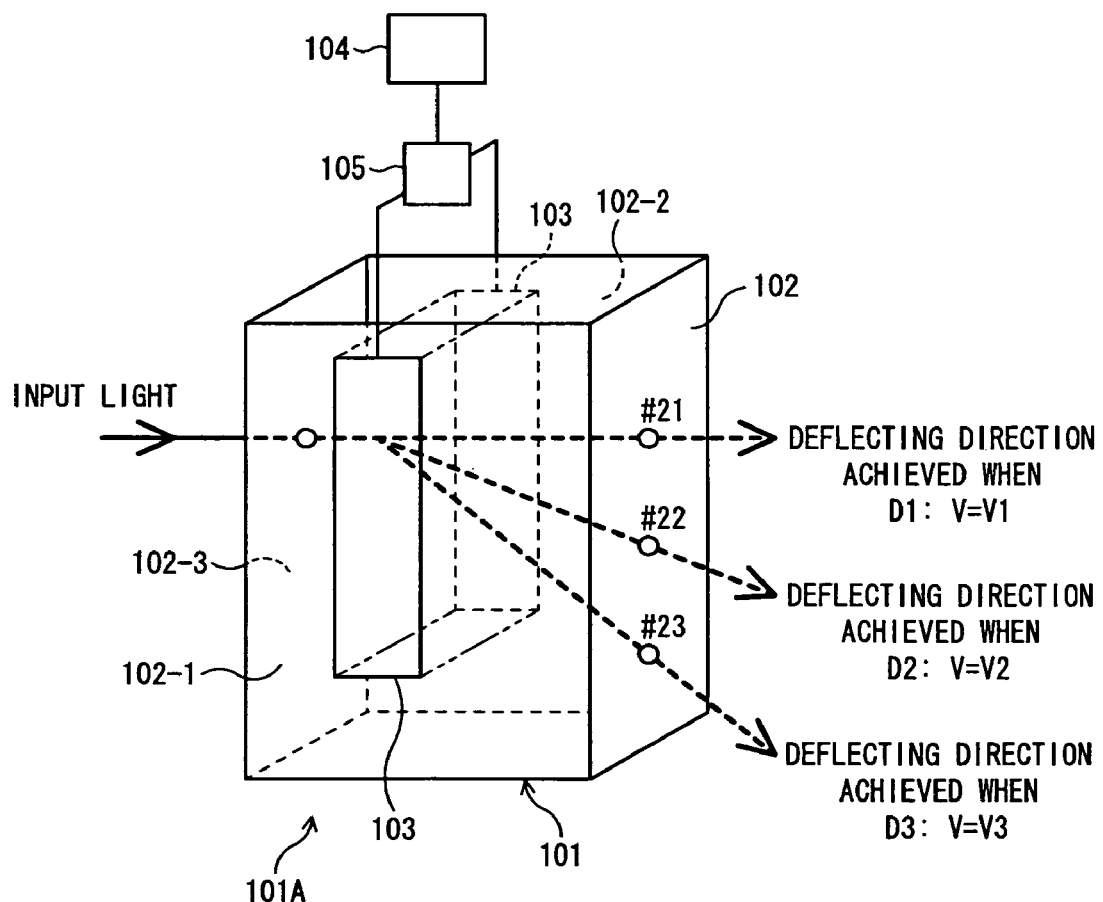
FIG. 14 is a view showing an example optical switch formed from a light deflection device.
Figure 15:
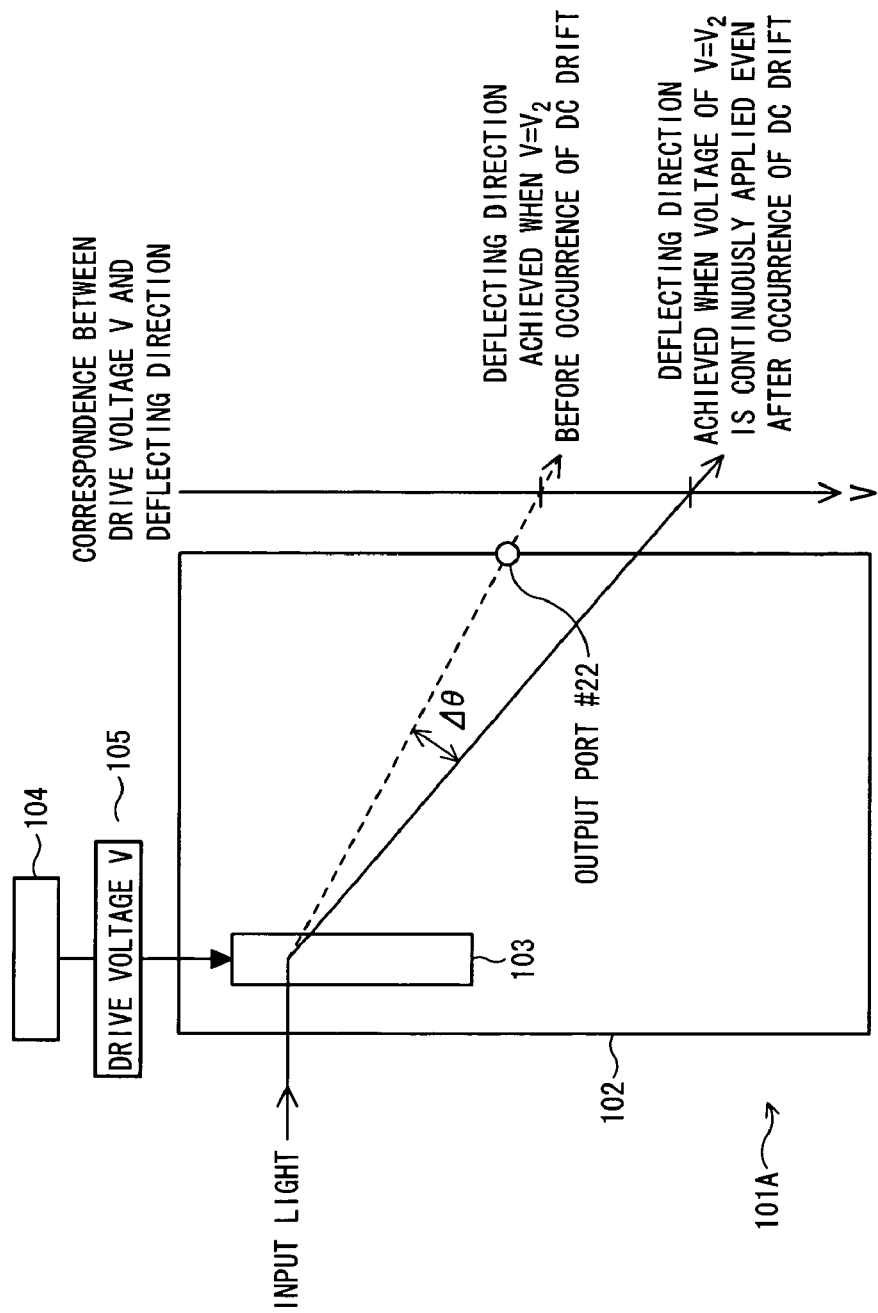
FIG. 15 is a view for describing a problem of the optical switch shown in FIG. 14.

The first electrode controller 7-1 controls the supply of the first drive voltage to the first electrodes 3-1 to thereby deflect the input light, so that the light can be output by way of any one of the output ports #21 to #23 that is set as a destination, as in the case shown in FIG. 14. The second electrode controller 7-2 controls the supply of the second drive voltage to the second electrodes 3-2, so that an attempt can be made to stabilize the power of output light, as will be described later.

The first electrode controller 7-1 functions as a first supply control section that takes, as a first drive voltage, a drive voltage used for deflecting input light according to the position of an output port—which is to become a destination—and controls the supply of the first drive voltage to the first light deflection element. The first electrode controller 7-1 comprises a control circuit 4 and a drive circuit (a supply section) 5. The control circuit 4 is formed from a storage section 4a and a processing section 4b, and outputs a control signal used for supplying the first drive voltage to the first electrodes 3-1. The drive circuit 5 supplies the first drive voltage to the first electrodes 3-1 in accordance with the control signal output from the control circuit 4.

The storage section 4a of the control circuit 4 stores, in the form of, e.g., a table shown in FIG. 6, data pertaining to the first drive voltage to be supplied according to the position of the output port that is to become a destination. Specifically, as shown in FIG. 6, VA1 to VA3 are stored as the values of the first drive voltage VA appropriate to the output ports #21 to #23 that are to become destinations. When an output port, which is a destination of input light, is not set, the first drive voltage VA is set to VOFF, and there is stored a value used for setting a deflection angle at which no light leaks to any of the output ports #21 to #23.

Moreover, the processing section 4b comprises a drive voltage control section 4ba for outputting, to the drive circuit 5, a control signal of the first drive voltage appropriate to the output port—which is to become a destination of switching—by reference to data in the storage section 4a; and an update control section 4bb for updating information about the first drive voltage in the storage section 4a.

The drive voltage control section 4ba is arranged so as to be able to receive information about any of the outputs ports #21 to #23, which is to become a destination of switching, by means of command information acquired by way of an external interface 9. Specifically, the drive voltage control section 4ba has the function of ascertaining information about any one of the output ports #21 to #23, which is to become a destination of switching, by analyzing the command information acquired by way of the external interface 9; the function of acquiring information about the first drive voltage appropriate to the one of the output ports #21 to #23 that has been ascertained to become a destination of switching, by reference to the storage section 4a; and the function of supplying a control signal to the drive circuit 5 in order to cause the drive circuit 5 to supply a first drive voltage according to the acquired information.

The second electrode controller 7-2 functions as a second supply control section for controlling the supply of the second drive voltage to the second light deflection element such that the power of the light output from the output port is maximized. The second electrode controller 7-2 has power monitors 8a for monitoring the power of the light output from the respective output ports, and a processing section 8b. The power monitors 8a can be formed from photodiodes (PD) which are provided at the respective positions of the output ports #21 to #23 and which monitor the power of the light output from the output ports #21 to #23.

The processing section 8b comprises a feedback control section 8ba which controls the second drive voltage supplied to the second light deflection element 6-2 through feedback control on the basis of a monitoring result output from the power monitor 8a such that the power of the light output from the output port, which is taken as a destination, is maximized; and an alarm output section 8bb which outputs an alarm when the range of the second drive voltage controlled by the feedback control section 8ba exceeds a controllable range.

The processing section 4b of the first electrode controller 7-1 and the processing section 8b of the second electrode controller 7-2 constitute control systems which are independent of each other. These processing sections can be constituted of a CPU (Central Processor Unit), or the like. Since the CPUs serving as the processing sections 4b, 8b are provided individually, processing loads of the processing sections can be lessened, and in particular the response characteristic of the processing section 4b responsive to switching of an output channel can be speeded up. Alternatively, the function of the processing section 8b can be realized by an analog circuit configuration, such as a comparator. By means of such a configuration, an increase in the speed of operation of the processing section 8b and a curtailment of parts costs can be expected.

[A2] Working-Effects

[A2-1] Supply of drive voltages performed by the first and second electrode controllers 7-1, 7-2

Upon receipt of an input of light by way of the input port #11, the optical switch 1 of the present embodiment configured as mentioned above can output the light by way of any of the output ports #21 to #23, which has been selected as a destination, by means of switching.

Figure 7:
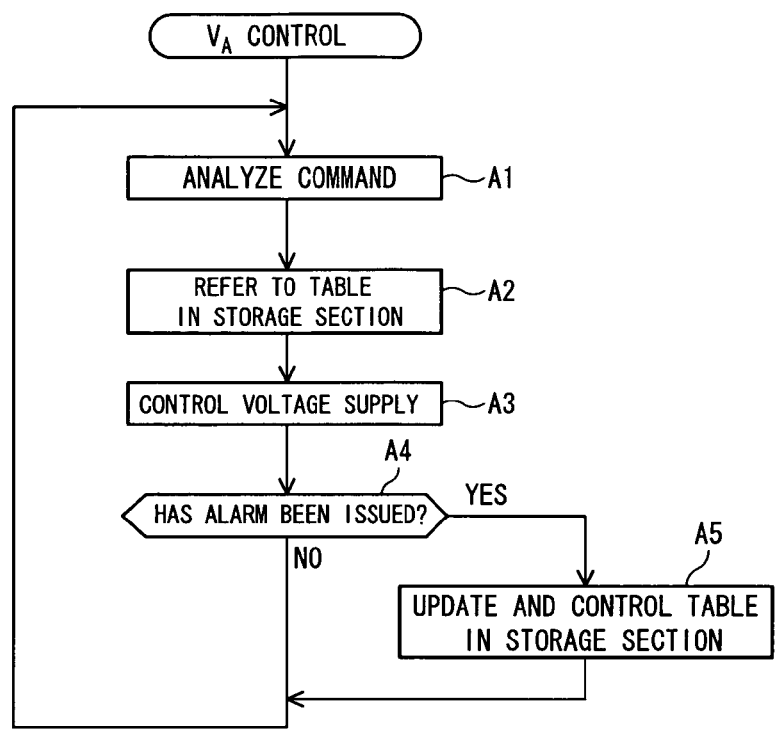
FIG. 7 is a flowchart for describing the control of supply of a first drive voltage to a first electrode performed by a first electrode controller of the present embodiment.

At this time, the first electrode controller 7-1 controls the supply of the drive voltage (the first drive voltage) to the first electrode 3-1 as indicated by the flowchart shown in FIG. 7, thereby selectively switching among the output ports #21 to #23 as a destination.

Specifically, before input of light, the drive voltage control section 4ba of the first electrode controller 7-1 receives the information about the one of the output ports #21 to #23 that is to become a destination of switching, by means of the command information acquired through the external interface 9. This command information is analyzed, to thus ascertain which one of the output ports #21 to #23 is to become a destination of switching (step A1).

The drive voltage control section 4ba acquires information about the first drive voltage complying with the one of the output ports #21 to #23 that has been ascertained to be a destination of switching, by reference to the storage section 4a (step A2). The drive voltage control section 4ba outputs the control signal to the drive circuit 5 in order to cause the drive circuit 5 to supply the first drive voltage in accordance with the acquired information. Thereby, pursuant to the control signal output from the drive voltage control section 4ba, the drive circuit 5 supplies the first drive voltage to the first electrode 3-1 such that input light is deflected toward the one of the output ports #21 to #23 that has been determined to be the destination (step A3).

For instance, upon receipt of an input of a command to the effect of "light is to be output to the output port #22" from the external interface 9, the drive voltage control section 4ba acquires a voltage (the first drive voltage) to be applied to the first electrode 3-1 on the basis of correspondence between the output ports #21 to #23 and the applied voltage, which is stored in the storage section 4a (i.e., computes a drive voltage by means of arithmetic processing, or the like, when arithmetic operation on the value stored in the storage section 4a is required) The thus-acquired voltage is applied to the first electrode by way of the drive circuit 5.

When a command to the effect of "a state where input light is not output from any of the output ports #21 to #23" has been input, the voltage used for deflecting light in a direction where the output ports #21 to #23 are not present is applied to the first electrode 3-1 by way of the drive circuit 5.

As mentioned above, the first electrode controller 7-1 controls the supply of the first drive voltage in response to the command information. Since the control does not entail control operation which requires consumption of much time before a response is stabilized, such as a feedback loop, a response time can be comparatively speeded up.

When the first electrode controller 7-1 has received the alarm signal issued by the second controller 7-2 during the course of controlling the supply of the first drive voltage (YES in step A4), the update control section 4bb updates and controls the specifics of the first drive voltage stored in the storage section 4a as will be described later (step A5). If there is no alarm signal, the controlled supply of the first drive voltage complying with the command information is continuously performed (from NO in step A4 to step A1).

As mentioned above, selective switching among the output ports #21 to #23 in relation to the input light is performed by means of the controlled supply of the first drive voltage to the first electrode 3-1 performed by the first electrode controller 7-1. Deflection of the input light performed by the first light deflection element 6-1—which is operated by the controlled supply of the drive voltage performed by the first electrode controller 7-1—is insufficient to cause efficient output of light with fewer losses from the one of the output ports #21 to #23 that is the destination.

As mentioned previously, the first light deflection element 6-1 for coarse adjustment purpose enables deflection of light over the range of a comparatively wide deflection angle. However, the drive voltage cannot have a resolution which is sufficient to finely adjust the deflection angle. Accordingly, losses arise in the light output from any one of the output ports #21 to #23. Alternatively, even when a DC drift has arisen, losses also arise in output light.

Figure 9:
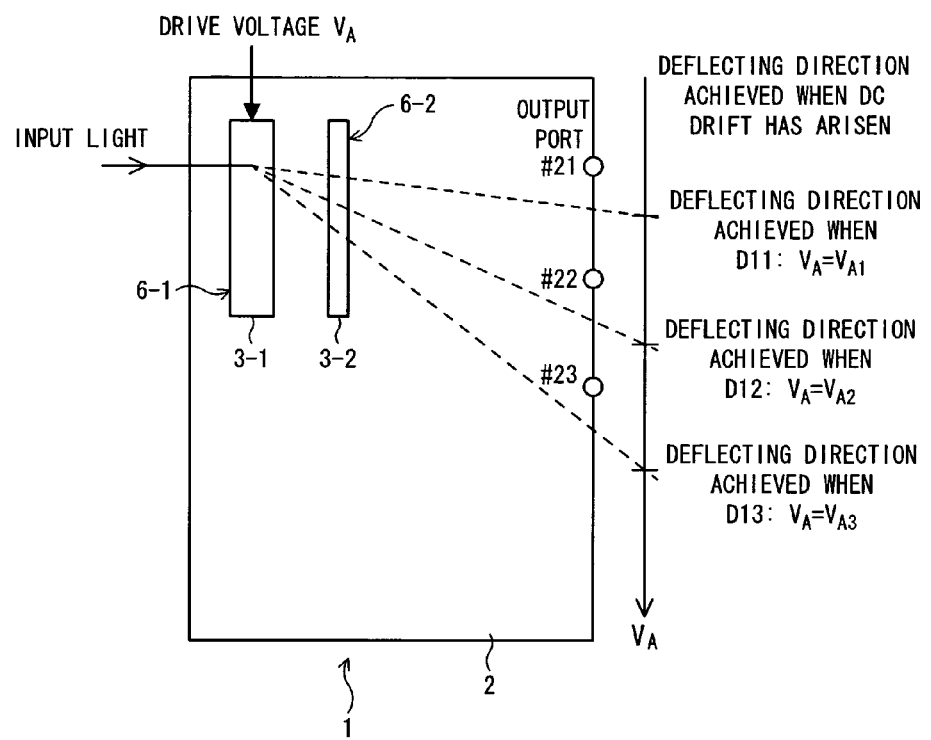
FIGS. 9 to 11 are views for describing the control of supply of a second drive voltage to a second electrode performed by the second electrode controller of the present embodiment.

For instance, in a case where a DC drift has arisen in the first light deflection element 6-1, even when the first drive voltage VA, which is a drive voltage appropriate to the one of the output ports #21 to #23 that is the destination, has been applied to the first electrode controller 7-1, the deflecting direction of input light is displaced, as shown in FIG. 9, from the position of the destination output port among the output ports #21 to #23.

Specifically, light, which is output from the output port #21 when the first drive voltage VA is set to VA1, is deflected in the deflecting direction D11 that is displaced from the position of the output port #21 in FIG. 9. Light, which is output from the output port #22 when the first drive voltage VA is set to VA2, is deflected in the deflecting direction D12 that is displaced from the position of the output port #22 in the drawing. Light, which is output from the output port #23 when the first drive voltage VA is set to VA3, is deflected in the deflecting direction D13 that is displaced from the position of the output port #23 in the drawing. Accordingly, losses arise in the light output from any one of the output ports #21 to #23.

Figure 8:
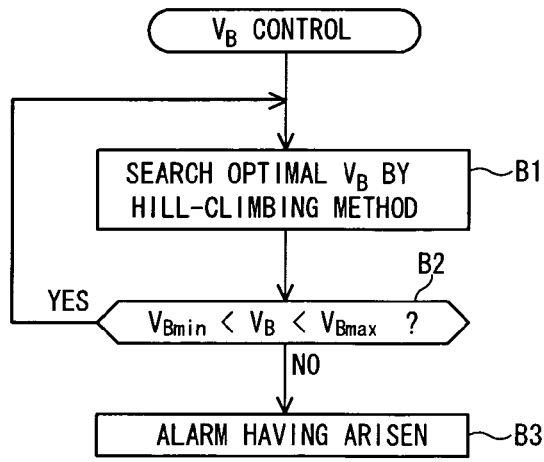
FIG. 8 is a flowchart for describing the control of supply of a second drive voltage to a second electrode performed by a second electrode controller of the present embodiment.

In the present embodiment, the second light deflection element 6-2 finely adjusts the deflection angle of the light output from the first light deflection element 6-1, so that the power of the light output from the output port that is set as the destination can be maximized. Specifically, as indicated by the flowchart shown in FIG. 8, the second electrode controller 7-2 controls the supply of the drive voltage (the second drive voltage) to the second electrode 3-2, and hence the power of output light can be maximized while the response characteristic of the first light deflection element 6-1 responsive to switching of the channel is ensured.

Specifically, the power monitors 8a constituting the second electrode controller 7-2 monitor the power of the light output from the one of the output ports #21 to #23 that has been set as the destination. The feedback control section 8ba in the processing section 8b uses an algorithm, such as a hill-climbing method or the like, while taking a monitoring result of power of the output light delivered by the power monitor 8a as a feedback element, to thus seek a drive voltage (the second drive voltage VB) which maximizes the power of output light and is to be output to the second electrode 3-2 (step B1).

Figure 10:
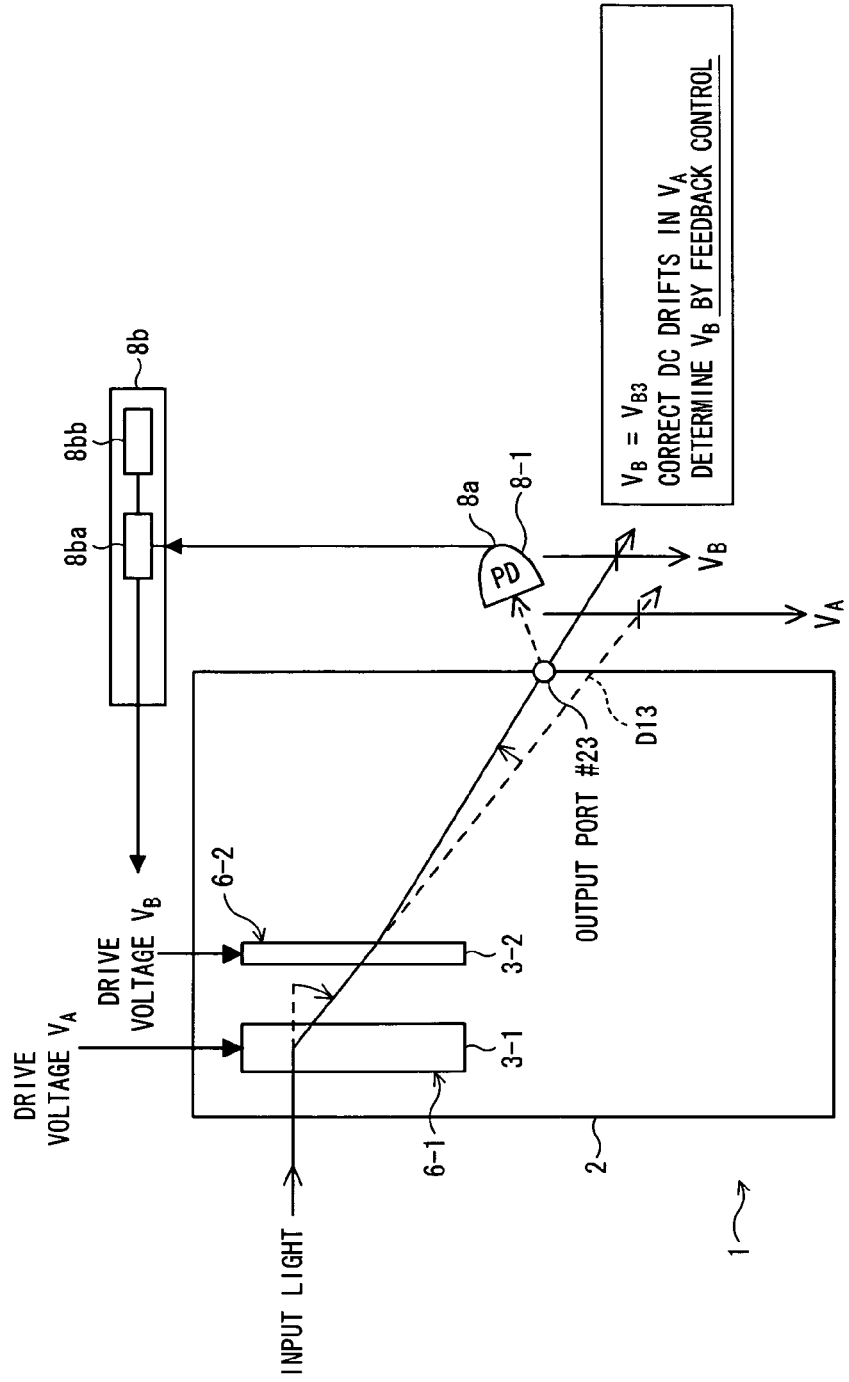

As shown in FIG. 10, for instance, even when the light, which is to be output from the output port #23, is deflected to the deflection direction D13 displaced from the position of the output port #23 in the drawing, the feedback control section 8ba seeks the second drive voltage VB while taking as a feedback element a monitoring result of power of the light output from the output port #23 delivered from the power monitor 8a, so that the drive voltage VB to be supplied to the second electrode 3-2 can be set to VB3, which maximizes the power of the light output from the output port #23.

When the value of VB acquired during search for the second drive voltage VB that maximizes the power of output light falls within a range of VB min<VB<VB max defined as a deflectable angle range set for the second light deflection element 6-2, search for the second drive voltage VB is continued (YES in step B2).

However, when the value of VB acquired during search for the second drive voltage VB that maximizes the power of output light has become a voltage value equivalent to the limit of the range determined as the deflectable angle range for the second light deflection element 6-2 (or when the value of VB has exceeded a voltage value equivalent to the limit), an alarm is output to the first electrode controller 7-1 by way of the alarm output section 8bb (NO in step B2 to step B3).

Specifically, when the second drive voltage has become displaced from the VB min<VB<VB max range of the second drive voltage, which is equivalent to the range determined as the deflectable angle range for the second light deflection element 6-2, the power of the light output from the output port #23 that is the destination cannot be maximized by only the deflecting operation performed by the second light deflection element 6-2.

Figure 11:
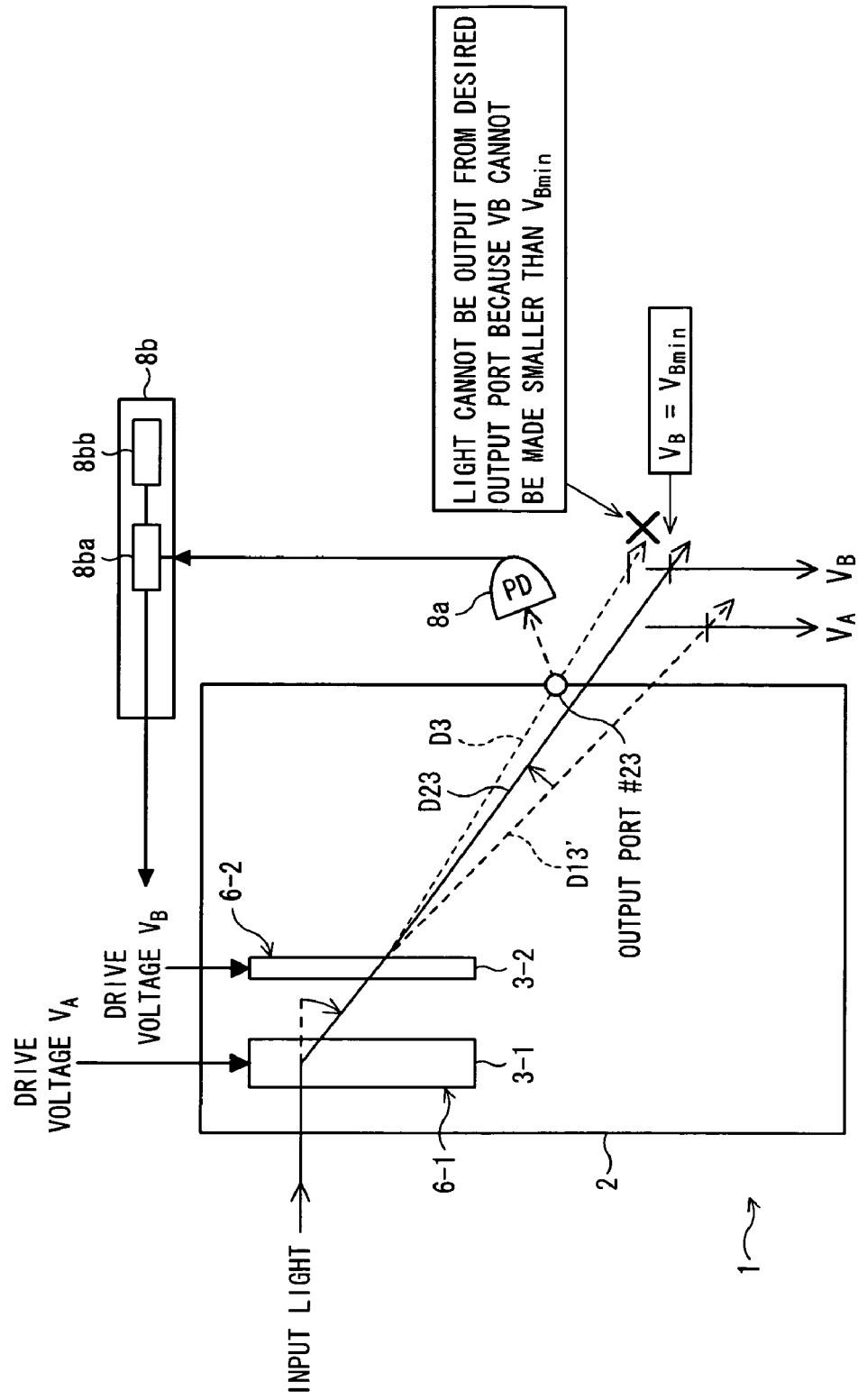

As shown in, e.g., FIG. 11, when the light to be output from the output port #23 is deflected to a deflection direction D13' displaced leftward from the position of the output port #23 in FIG. 11, the light cannot be deflected to the deflection direction D3, where the power of light output from the output port #23 is maximized, even when the second drive voltage VB is set to VB min—which is the lower limit value—during rightward correction of the direction of the light by the second light deflection element 6-2.

Specifically, even when the second drive voltage VB is set to VB min serving as the lower limit value, the deflection direction becomes D23, and a deflection angle for orienting light rightward becomes insufficient to orient light to the deflection direction D3. Specifically, the second light deflection element 6-2 cannot be actuated at a voltage, which is smaller than VB min, for deflecting light further rightward from D23. In this case, the power of the light output from the output port #23 cannot be maximized.

Put another way, the second light deflection element 6-2 for fine adjustment purpose has high resolution but is narrower than the first light deflection element 6-1 in terms of the dynamic range of the deflection angle. Therefore, when the deflection angle of the second light deflection element 6-2 comes to the end of the dynamic range during the course of pursuing the DC drift or the like, there may arise a case where the deflection angle cannot be controlled any further.

By means of the alarm signal being output to the first electrode controller 7-1 by way of the alarm output section 8bb, the data stored in the storage section 4a of the first electrode controller 7-1 are updated. Thereby, as will be described later, the power of the light output from the output port #23 can be maximized.

The range of the value of the second drive voltage, which is a criterion of judgment employed at the time of output of an alarm, may be provided with a given protective range on the basis of the deflectable angle range of the second light deflection element 6-2, so as to become VBP<VB<VBQ (VB min<VBP, VBQ<VB max) which is narrower than VB min<VB<VB max.

Even when losses have arisen in the light output from any one of the output ports #21 to #23 under the influence of the DC drift or the like, the second light deflection element 6-2 can finely adjust the deflection angle of the light output from the first light deflection element 6-1 while enhancing the performance of the first light deflection element 6-1 responsive to switching of the output channel. Accordingly, the power of the light output from the output port that is taken as a destination can be maximized.

In connection with the optical switch 101A shown in FIG. 14, the control circuit 104 is assumed to take the power of the light output from the output port as a feedback element and controls the drive voltage supplied to the electrode 103 such that the power of the output light is maximized. Loads stemming from control operation of the control circuit 104 are increased, which in turn delays a response time required to switch an output channel, thereby posing difficulty in ensuring required response performance.

In contrast, the optical switch 1 of the present embodiment comprises the first light deflection element 6-1 for coarse adjustment and the second light deflection element 6-2 for fine adjustment in connection with adjustment of the deflection angle of input light. The first and second light deflection elements 6-1, 6-2 are separately controlled by the first and second electrode controllers 7-1, 7-2, which are separated from each other on the circuit. Switching of the output channel performed by the first light deflection element 6-1 is not limited by the feedback control of the second drive voltage.

Consequently, the power of the light output from any one of the output ports #21 to #23 can be optimally controlled while the performance of response to switching of an output channel is speeded up as compared with the above-described case, even when a DC drift or the like has arisen.

[A2-2] Updating and controlling of data in the storage section 4a

When the alarm output section 8bb forming the second electrode controller 7-2 has output an alarm to the first electrode controller 7-1, the update control section 4bb of the first electrode controller 7-1 updates and controls information about the first drive voltage, the information being stored in the storage section 4a and the drive voltage being supplied according to which one of the output ports #21 to #23 has been selected, whereby the second electrode controller 7-2 can again perform control operation for maximizing the power of the light output from any one of the output ports #21 to #23.

Specifically, the update control section 4bb updates and controls the data in the storage section 4a by means of adding or subtracting a given amount of correction $\Delta VA$ to or from the data VA1 to VA3 that pertain to the first drive voltages for the respective output ports #21 to #23 and are stored in the storage section 4a, such that the light output from the output ports #21 to #23 becomes less displaced; namely, such that light becomes close to the deflection directions toward the output ports #21 to #23.

Figure 12:
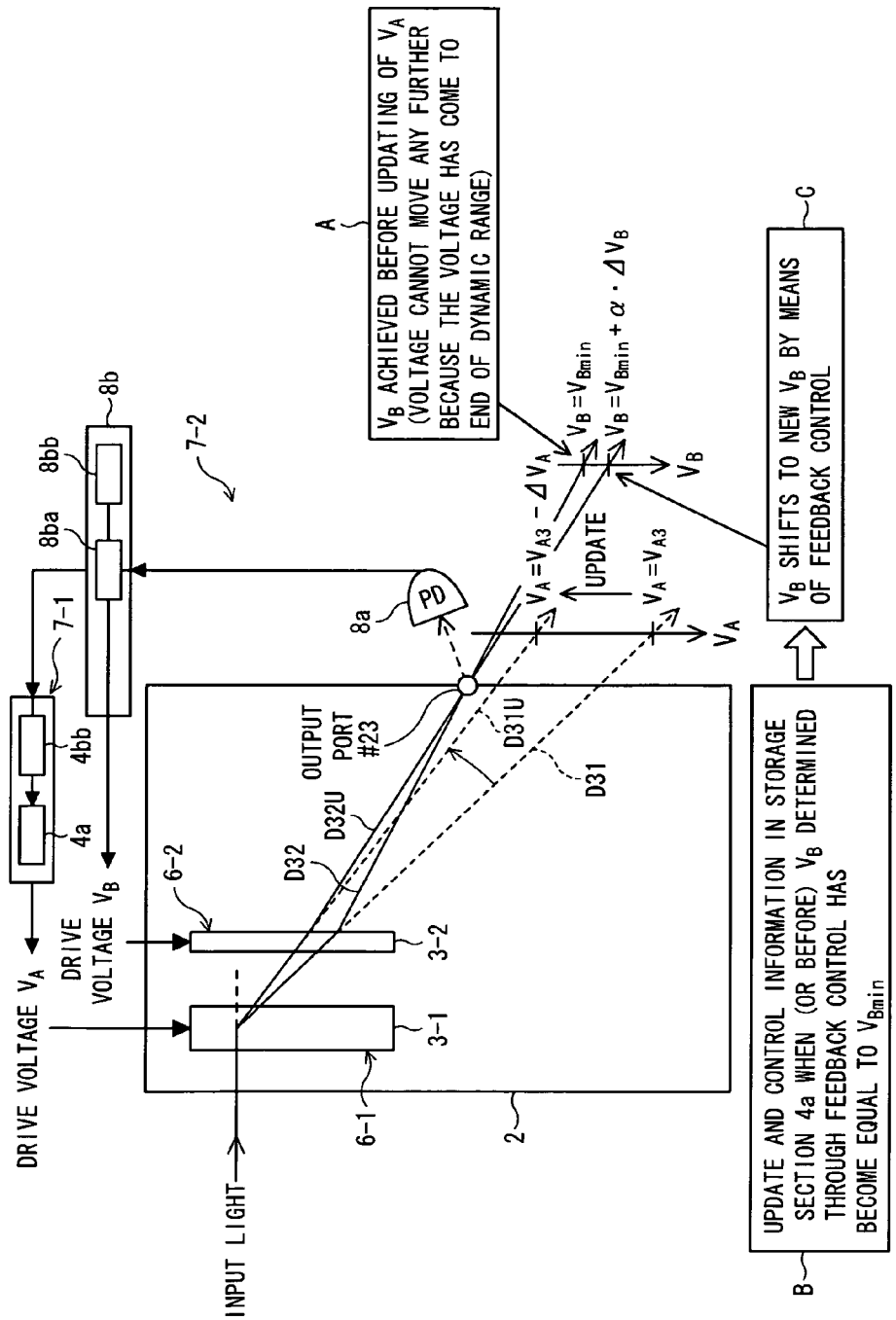
FIGS. 12 and 13 are views for describing the control of updating of the storage section performed by an update control section of the present embodiment.

As shown in FIG. 12, when the first drive voltage supplied to the first electrodes 3-1 is taken as VA3 and the deflection direction of the first light deflection element 6-1 is taken as D31, the second drive voltage VB acquired by the feedback control section 8ba is taken as VB min, which is the lower limit value of the second drive voltage. Thereby, the deflection direction is corrected leftward, to thus orient the light to the deflection direction D32 where the power of the light output from the output port #23 can be maximized.

However, when the first drive voltage supplied to the first electrodes 3-1 is set to VA3 and the direction—in which light is deflected by the first light deflection element 6-1—has shifted rightward in excess of D31 for reasons of the DC drift, or the like, having arisen in the first light deflection element 6-1, the deflection direction cannot be corrected leftward unless the second drive voltage can be made smaller than the lower limit value VB min. Therefore, there may arise a case where operation of the feedback control section 8ba for seeking and controlling VB is stopped (see A in FIG. 12).

Accordingly, the value VA3 of the first drive voltage relating to the output port #23 stored in the storage section 4a is updated and controlled so as to become a value of VA3−$\Delta VA$, which is determined by subtracting a predetermined amount $\Delta VA$ from the value VA3 of the first drive voltage (see B in FIG. 12). Thereby the first drive voltage VA is updated and controlled such that the deflection direction can be made close to the output port #23.

Thus, the drive voltage control section 4ba of the first electrode controller 7-1 can output, to the drive circuit 5, a control signal which is based on the updated data in the storage section 4a and is used for supplying the first drive voltage. Consequently, the first drive voltage VA supplied by the first electrode controller 7-1 is also changed to VA3−$\Delta VA$, and hence the direction where the input light is deflected by the first light deflection element 6-1 is also made close, as shown by D31U in FIG. 12, to the position of the output port #23.

As a result of the direction—where the input light is deflected by the first light deflection element 6-1—having become D31U as mentioned above, the value of the second drive voltage VB determined by the feedback control section 8ba also falls within the above-described voltage range, so that search control operation can be performed stably. D32U designates a deflection direction achieved when a deflection direction is finely adjusted by means of the value of the second drive voltage VB; i.e., VB=VB min+α·ΔVB, searched by the feedback control section 8ba when the direction where the input light is deflected by the first light deflection element 6-1 has become D31U, to thus maximize the power of the light output from the output port #23 (see C in FIG. 12).

When the value of the second drive voltage VB has become the upper limit value VB max, the deflection direction achieved by the first drive voltage VA can be made close to the output port #23 by means of increasing the value VA3 of the first drive voltage by the predetermined amount ΔVA. The value of ΔVA serving as the amount of correction can be set so as to fall within a range of, e.g., "0"—where the deflection direction remains unchanged—to a voltage, as an upper limit, at which the deflection angle provided by the first light deflection element 6-1 is displaced by a deflection angle (see θBR max in FIG. 5) with respect to the straight-forward direction achieved when the second drive voltage of the second light deflection element 6-2 is taken as VB max.

When the data in the storage section 4a are updated by the update control section 4bb, the first drive voltage information VA3 pertaining to the output port #23, which is to become the destination, is updated and controlled as mentioned previously. In addition, as shown in, e.g., FIG. 13, the first drive voltage information pertaining to the other output ports #21, #22 or the first drive voltage information achieved when the destination is not set is also updated and controlled in the same manner.

Specifically, when a displacement has arisen in the direction where light output from the output port #23 is deflected by the first light deflection element 6-1, a similar displacement can be determined to arise in the deflection direction of the first light deflection element 6-1 even when the other output port #21 or #22 is employed or when the output port is not set. Accordingly, the data stored in the storage section 4a are updated and controlled beforehand, whereby an undesired alarm output can be suppressed.

In a strict sense, the extent to which the deflection angle is changed by ΔVA varies from one output port to another among the output ports #21 to #23. So long as the feedback control section 8ba can search the second drive voltage to be supplied to the second electrodes 3-2, the maximum power can be acquired from the light output from each of the output ports #21 to #23.

[A2-3]

As mentioned above, according to the embodiment of the present invention, the second light deflection element 6-2 is provided along with the first light deflection element 6-1. As a result, even when losses have arisen in the light output from any one of the output ports #21 to #23 under the influence of a DC drift or the like, the second light deflection element 6-2 can finely adjust the angle at which light is deflected by the first light deflection element 6-1, while enhancing the response of the first light deflection element 6-1 to switching of an output channel. The losses in the power of output light can be minimized (or the power of output light can be maximized) while deflection of light over the range of a comparatively-large deflection angle used for switching an output port is enabled.

Even when a DC drift or the like has arisen, the second light deflection element 6-2 can minimize losses in output power (or maximize the power of output light) while tracking the drift component.

By means of the first electrode controller 7-1 and the second electrode controller 7-2, the feedback control performed by the second electrode controller 7-2 for tracking the DC drift and switching control operation performed by the first electrode controller 7-1 for selecting an output port are separated from each other on the circuit level and can be performed independently of each other. Therefore, control of switching operation performed by the drive voltage control section 4ba is not limited by the control operation intended for tracking the DC drift.

[B] Others

Notwithstanding the above-described embodiment, the present invention can be practiced in various manners within the scope of the gist of the invention.

For instance, the number of output ports, the deflection direction of the first light deflection element 6-1, and the deflection direction of the second light deflection element 6-2 are not limited to the above-described embodiment.

The crystal member 2, which constitutes the first light deflection element 6-1 and the second light deflection element 6-2, is formed integrally. However, adoption of any other configuration is also allowed.

Further, the device of the present invention can be manufactured by means of disclosure of the embodiment.

What is claimed is:

1. An optical switch which deflects an input light to output the input light to a designated part of a plurality of output ports in a switching manner, the optical switch comprising:
   a first light deflection element for deflecting the input light at an angle corresponding to a position of the designated port with an applied first drive voltage; and
   a second light deflection element for finely adjusting a deflection angle of the light propagating from the first deflection element to the designated port with an applied second drive voltage such that a power of light output from the designated port becomes maximum, wherein
   the first light deflection element comprises a crystal member exhibiting an electro-optic effect and electrodes formed on opposing faces of the crystal member and, receiving a supply of the first drive voltage, and
   the second light deflection element comprises a crystal member exhibiting an electro-optic effect and electrodes formed on opposing faces of the crystal member, and receiving a supply of the second drive voltage.

2. The optical switch according to claim 1, further comprising:
   a first supply control section for controllably supplying the first drive voltage to the first light deflection element; and
   a second supply control section for controllably supplying the second drive voltage to the second light deflection element such that power of light output from the output port becomes maximum.

3. The optical switch according to claim 2, wherein the first supply control section includes
   a storage section for storing information pertaining to the first drive voltage to be supplied for each positions of the plural output ports;

a drive voltage control section for outputting a control signal of the first drive voltage corresponding to the designated port by making reference to information in the storage section; and a supply section for supplying the first drive voltage to the first deflecting element in accordance with the control signal output from the drive voltage control section.

4. The optical switch according to claim 3, wherein the second supply control section includes a power monitor for monitoring power of light output from each of the output ports; and a feedback control section for controlling a feedback of the second drive voltage to be supplied to the second light deflection element, on the basis of a monitoring result output from the power monitor, such that light output from the designated port becomes maximum.

5. The optical switch according to claim 2, wherein the second supply control section includes a power monitor for monitoring power of light output from each of the output ports; and a feedback control section for controlling a feedback of the second drive voltage to be supplied to the second light deflection element, on the basis of a monitoring result output from the power monitor, such that light output from the designated port becomes maximum.

6. The optical switch according to claim 2, wherein the first supply control section includes a storage section for storing information pertaining to the first drive voltage to be supplied for each positions of the plural output ports, a drive voltage control section for outputting a control signal of the first drive voltage corresponding to the designated port by making reference to information in the storage section, and a supply section for supplying the first drive voltage to the first deflecting element in accordance with the control signal output from the drive voltage control section;

the second supply control section includes a power monitor for monitoring power of light output from each of the output ports, and a feedback control section for controlling a feedback of the second drive voltage to be supplied to the second light deflection element, on the basis of a monitoring result output from the power monitor, such that light output from the designated port becomes maximum;

the second supply control section includes an alarm output section for issuing an alarm to the first supply control section when the second drive voltage controlled by the feedback control section exceeds a preset range of a voltage; and the first supply control section includes an update control section for updating and controlling information about the first drive voltage stored in the storage section when having received the alarm issued from the alarm output section.

7. The optical switch according to claim 6, wherein the preset range is a voltage range of the second drive voltage corresponding to an angle range through which the second deflection element can effect deflection.

8. The optical switch according to claim 7, wherein the update control section corrects information about the first drive voltage such that a direction of deflection effected by the first light deflection element approaches an the designated port.

9. The optical switch according to claim 6, wherein the update control section corrects information about the first drive voltage such that a direction of deflection effected by the first light deflection element approaches the designated port.

10. The optical switch according to claim 1, wherein the first and second light deflection elements are configured such that a deflection resolving power of the second light deflection element is higher than a deflection resolving power of the first light deflection element.

11. The optical switch according to claim 1, wherein the crystal members constituting the first and second light deflection elements are formed into a single piece.

12. An optical deflecting method comprising:

deflecting light by a first light deflection element comprising a crystal member exhibiting an electro-optic effect and electrodes formed on opposing faces of the crystal member, the light being deflected by the first light deflection element in accordance with a first drive voltage applied to the electrodes of the first light deflection element so that the light is deflected at an angle corresponding to a position of a designated port; and further deflecting the deflected light by a second light deflection element which comprises a crystal member exhibiting an electro-optic effect and electrodes formed on opposing faces of the crystal member, so that the further deflected light is deflected at a finely adjusted deflection angle to the designated port in accordance with a second drive voltage applied to the electrodes of the second light deflection element to thereby output the further deflected light from the designated port, and so that a power of the further deflected light output from the designated port becomes maximum.

13. An optical switch receiving an input light, comprising:

a first light deflection element comprising a crystal member exhibiting an electro-optic effect and electrodes formed on opposing faces of the crystal member, the first light deflection element deflecting the input light, in accordance with a first drive voltage applied to the electrodes, at a first angle corresponding to a position of a designated output port of the optical switch; and a second light deflection element comprising a crystal member exhibiting an electro-optic effect and electrodes formed on opposing faces of the crystal member, the second light deflection element deflecting, in accordance with a second drive voltage applied to the electrodes of the second light deflection element, the light deflected by the first light deflection element at a second angle less than the first angle and corresponding to a position of the designated port, so that the light deflected by the second light deflection element is output from the designated port at a maximum power level.

* * * * *

UNITED STATES PATENT AND TRADEMARK OFFICE
CERTIFICATE OF CORRECTION

| | |
|---|---|
| PATENT NO. | : 7,408,700 B2 |
| APPLICATION NO. | : 11/384288 |
| DATED | : August 5, 2008 |
| INVENTOR(S) | : Yutaka Kai et al. |

Page 1 of 1

It is certified that error appears in the above-identified patent and that said Letters Patent is hereby corrected as shown below:

Column 14, Line 34, change "part" to --port--.

Column 16, Line 4, before "the" delete "an".

Signed and Sealed this

Twenty-fifth Day of November, 2008

JON W. DUDAS
*Director of the United States Patent and Trademark Office*